(12) United States Patent
Hasegawa et al.

(10) Patent No.: US 11,828,454 B2
(45) Date of Patent: *Nov. 28, 2023

(54) LIGHTING DEVICE

(71) Applicant: Japan Display Inc., Tokyo (JP)

(72) Inventors: Makoto Hasegawa, Tokyo (JP);
Nobuyuki Suzuki, Tokyo (JP);
Masafumi Okada, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/943,368

(22) Filed: Sep. 13, 2022

(65) Prior Publication Data

US 2023/0086503 A1 Mar. 23, 2023

(30) Foreign Application Priority Data

Sep. 17, 2021 (JP) .................. 2021-152154

(51) Int. Cl.
*F21V 7/00* (2006.01)
*F21S 8/04* (2006.01)
*F21Y 115/10* (2016.01)

(52) U.S. Cl.
CPC .............. *F21V 7/0091* (2013.01); *F21S 8/04* (2013.01); *F21Y 2115/10* (2016.08)

(58) Field of Classification Search
CPC ....... F21V 7/0091; F21S 8/04; F21Y 2115/10; G02F 1/1336; G02F 1/1337
See application file for complete search history.

(56) References Cited

U.S. PATENT DOCUMENTS

| 11,294,223 | B2* | 4/2022 | Hasegawa | ............... F21V 13/12 |
| 2011/0019421 | A1* | 1/2011 | Lai | ........................... F21K 9/27 |
| | | | | 362/249.02 |
| 2019/0025657 | A1 | 1/2019 | Presniakov et al. | |
| 2021/0054994 | A1* | 2/2021 | Qui | .......................... F21S 8/04 |

FOREIGN PATENT DOCUMENTS

JP 2011-159435 A 8/2011

* cited by examiner

*Primary Examiner* — Andrew J Coughlin
*Assistant Examiner* — Jessica M Apenteng
(74) *Attorney, Agent, or Firm* — Michael Best & Friedrich LLP

(57) ABSTRACT

The purpose of the present invention is to realize a lighting device which can be switched between an overall lighting and a local lighting with a single lighting device. The concrete structure is a lighting device including: a first light guide having a first major surface and a first back surface, and a first hole; a second light guide, disposed on the first light guide, and having a second major surface, a second back surface, and a second hole; a reflection sheet disposed under the first back surface of the first light guide; a liquid crystal lens disposed above the second major surface of the second light guide, in which first LEDs and second LEDs are disposed circumferentially along a side wall of the first hole and a side wall of the second hole, respectively, and the first LEDs and the second LEDs are displaced each other in azimuth direction.

11 Claims, 23 Drawing Sheets

B-B

C-C

D-D

FIG. 22
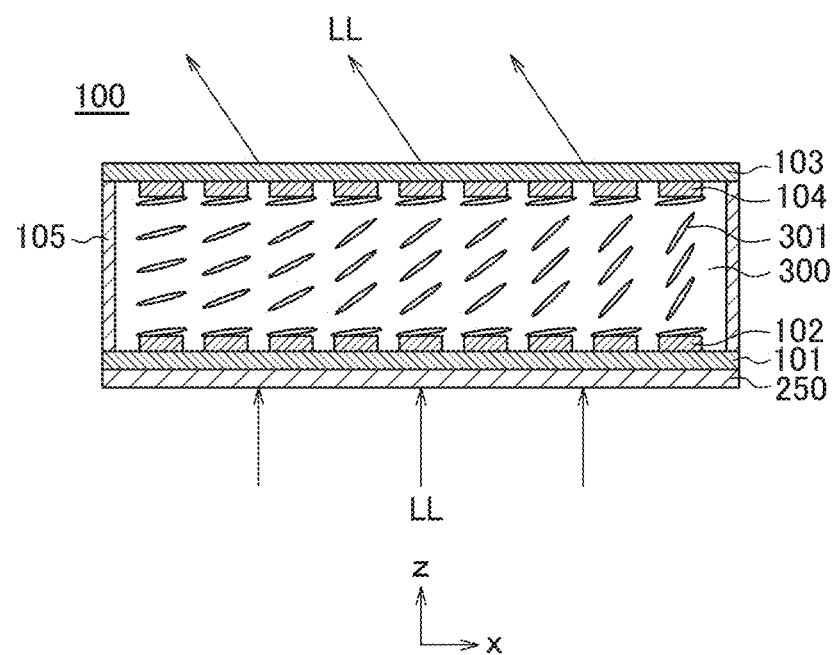
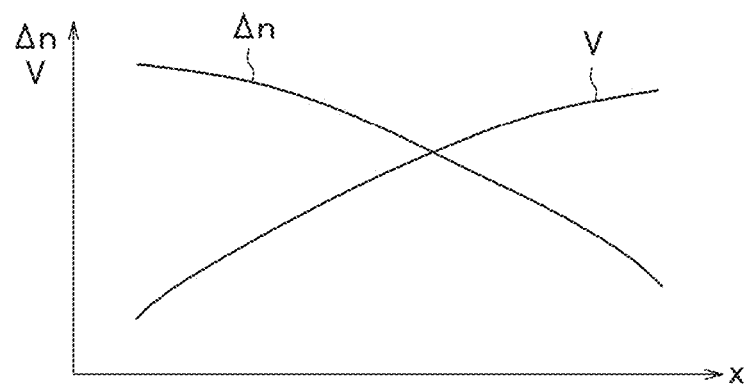

FIG. 23
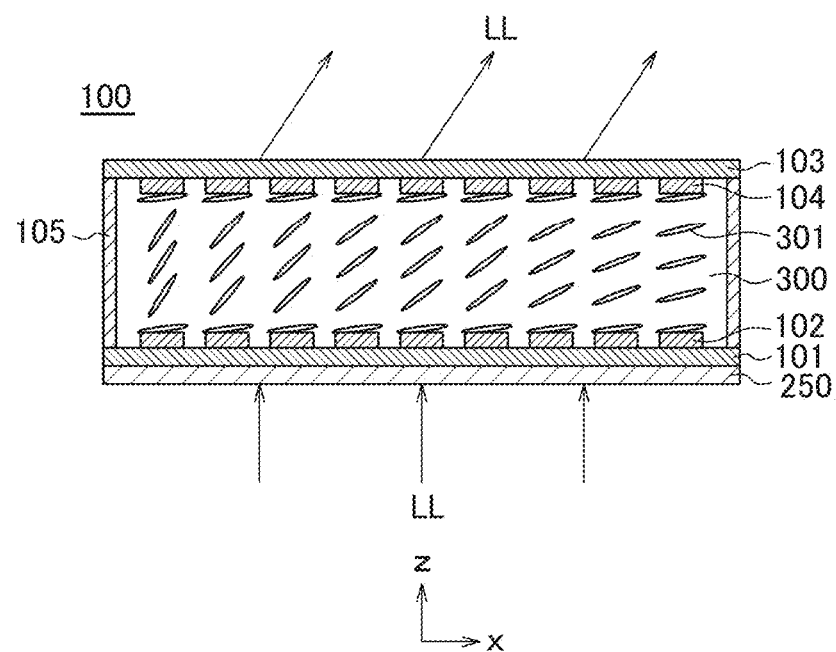
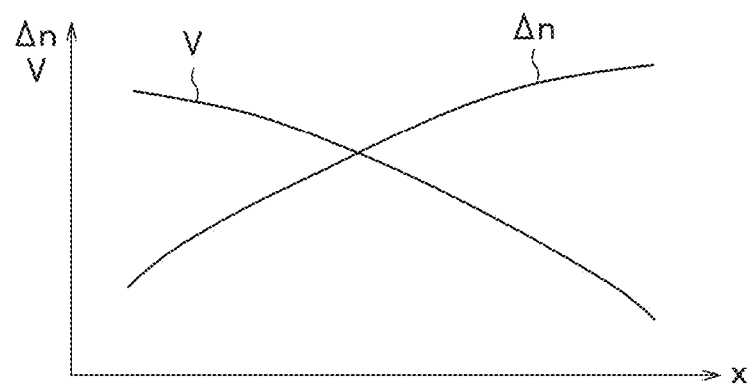

FIG. 30
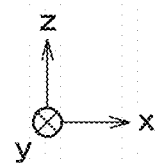
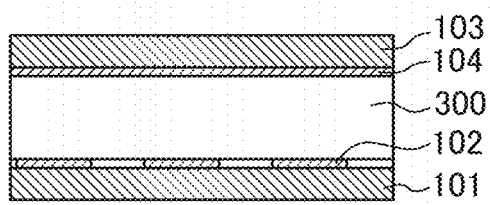
FIG. 31
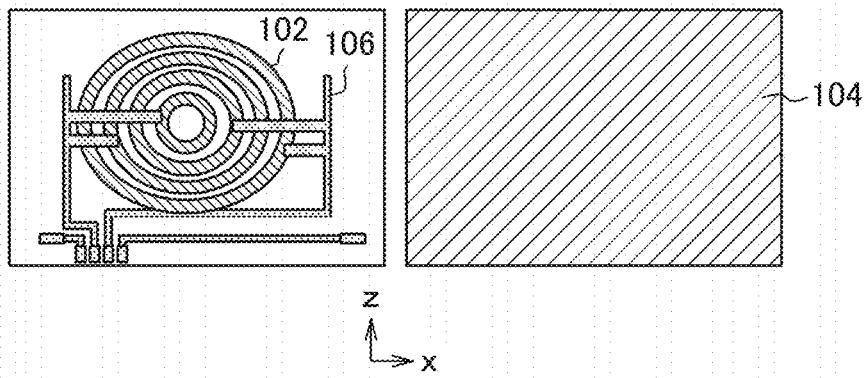

LIGHTING DEVICE

CLAIM OF PRIORITY

The present application claims priority from Japanese Patent Application JP 2021-152154 filed on Sep. 17, 2021, the content of which is hereby incorporated by reference into this application.

BACKGROUND OF THE INVENTION

(1) Field of the Invention

The present invention relates to a lighting device having functions of an overall lighting and a local lighting.

(2) Description of the Related Art

A Light Emitting Diode (LED) has become to be used widely. Since the LED has a high luminous efficiency, it is advantageous in energy saving. The LED, however, is a point light source, thus, it must be converted to a surface light source when it is used as a lighting device.

Patent document 1 discloses to convert a point light source to a surface light source suitable for overall lighting by setting LEDs along a wall of the light guide formed as disc shaped.

Patent document 2 discloses to control the shape of light beam by liquid crystal lens.

Patent Document

Patent document 1: Japanese patent application laid open No. 2011-159435
Patent document 2: US 2019/0025657 A1

SUMMARY OF THE INVENTION

Generally, the indoor lighting device illuminates overall of the interior (herein after may be called as overall lighting). This kind of lighting device may be suitable to illuminates all over of the interior, however, it is not suitable to light only a part of the interior and make dim in other area (herein after may be called as local lighting). When local lighting is necessary, a separate lighting device has been prepared.

The purpose of the present invention is to realize a lighting device which can provide an overall lighting and a local lighting using one device.

The present invention solves the above explained problems; examples of concrete structures of the present invention are as follows.

(1) A lighting device including: a first light guide having a first major surface and a first back surface, and a first hole at a first center, a second light guide, disposed on the first light guide, having a second major surface and a second back surface, and a second hole at a second center, a reflection sheet disposed under the first back surface of the first light guide, a liquid crystal lens disposed above the second major surface of the second light guide; in which a plurality of first LEDs are disposed circumferentially along a side wall of the first hole, a plurality of second LEDs are disposed circumferentially along a side wall of the second hole, and the first LEDs and the second LEDs are displaced each other in azimuth direction.

(2) The lighting device according to (1) in which a first prism array is formed on the first major surface of the first light guide, the first prism array extending radially in radius direction and arranged in circumferential direction, a second prism array is formed on the first back surface of the first light guide, the second prism array being formed concentrically in circumferential direction, a third prism array is formed on the second major surface of the second light guide, the third prism array extending radially in radius direction and arranged in circumferential direction, and a fourth prism array is formed on the second back surface of the second light guide, the fourth prism array being formed concentrically in circumferential direction.

(3) The lighting device according to (2), in which a cross section of the first prism array and a cross section of the third prism array are isosceles triangles, and a cross section of the second prism array and a cross section of the fourth prism array are scalene triangles.

(4) The lighting device according to (1), the liquid crystal lens has a converging effect to an incident light.

(5) The lighting device according to (1), the liquid crystal lens has a diverging effect to an incident light.

(6) The lighting device according to (1), the liquid crystal lens changes a direction to an incident light.

(7) The lighting device according to (1), the liquid crystal lens changes a direction of an incident light to inner circumference direction.

BRIEF DESCRIPTION OF THE DRAWINGS

FIG. 22 is an example of the structure to deflect a light beam by the liquid crystal lens;

FIG. 23 is another example of the structure to deflect a light beam by the liquid crystal lens;

FIG. 30 is a cross sectional view of the liquid crystal lens according to a fourth example;

FIG. 31 is plan views of a first electrode and a second electrode of the liquid crystal lens according to the fourth example;

DETAILED DESCRIPTION OF THE PREFERRED EMBODIMENTS

Figure 1:
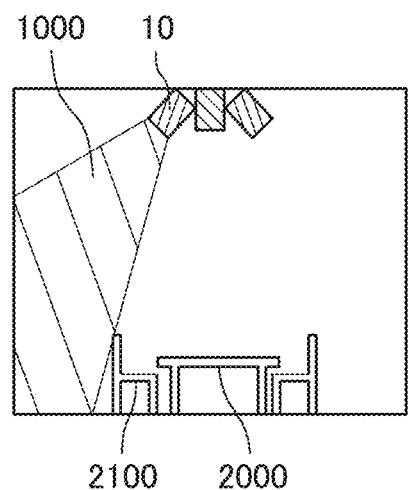
FIG. 1 is a cross sectional view in which a conventional lighting device performs a local lighting.
Figure 2:
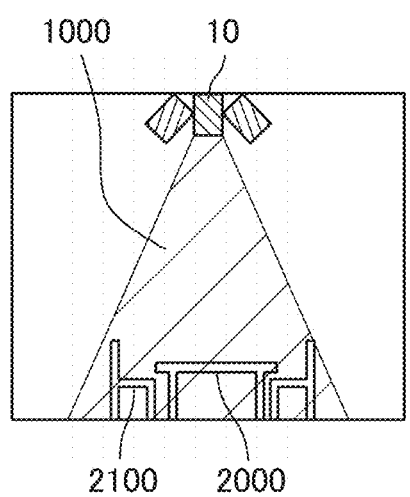
FIG. 2 is a cross sectional view in which the conventional lighting device performs a local lighting irradiating different place.
Figure 3:
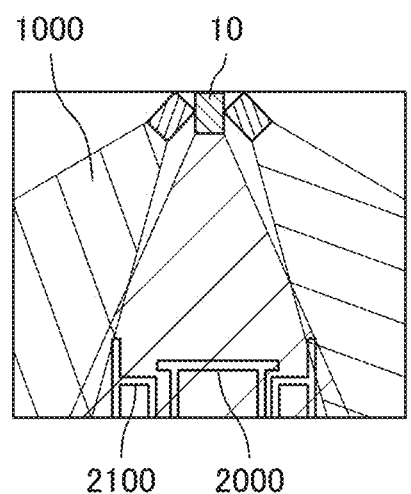
FIG. 3 is a cross sectional view in which the conventional lighting device performs an overall lighting.

FIGS. 1 to 3 are of cross sectional views of an example of a conventional lighting device which can perform an overall lighting and a local lighting. In FIGS. 1 to 3, a plurality of lighting devices 10 of small light distribution angle are used to be switched between an overall lighting and a local lighting. In FIG. 1, when only a corner of the room needs a light spot, only the lighting devices 10 facing oblique direction is lit. When only the center of the room, in which a table 2000 and a chair 2100 exist, is intended to be lit and other places of the room is dim, only the lighting device 10 faces down is lit.

On the other hand, if the room needs overall lighting, all the three lighting devices 10 are lit. That is to say, since the light distribution angle of each of the lighting devices 10 is small, a plurality of lighting devices 10 facing different directions are necessary to be lit to brighten the entire room. FIGS. 1 to 3 are cross sectional views of the room, therefore, actually five lighting devices 10 are necessary in a plan view, to light the cross sectional direction orthogonal to the cross sectional direction of FIGS. 1 to 3.

Figure 4:
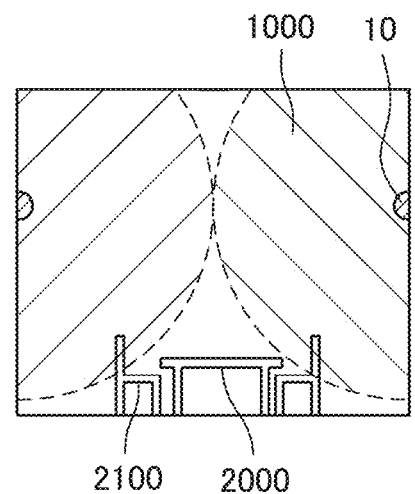
FIG. 4 is a cross sectional view in which conventional lighting devices disposed on the wall perform overall lighting.

FIG. 4 is a cross sectional view of the room in which lighting devices 10 are disposed on the walls. In FIG. 4, regions defined by broken lines are the places brightened by the lighting device. This method may be superior in design, however, it is rather difficult to use as an overall lighting or spot lighting.

Figure 5:
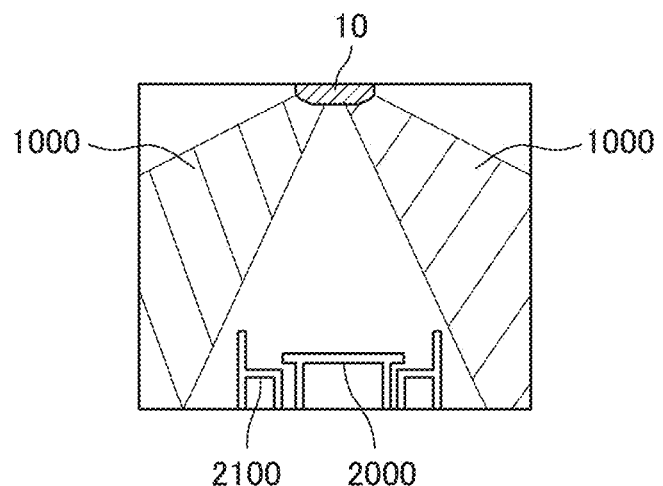
FIG. 5 is a cross sectional view in which a lighting device of the present invention performs a local lighting.
Figure 6:
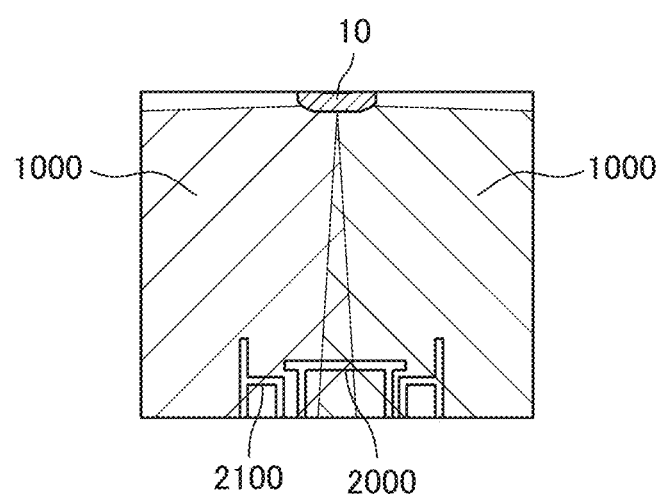
FIG. 6 is a cross sectional view in which the lighting device of the present invention performs an overall lighting.

FIGS. 5 and 6 are cross sectional views of a lighting device 10 according to the present invention which will be explained by the embodiment. The feature of the present invention is that one lighting device 10 can be switched between an overall lighting and a local lighting by changing a direction of light spot 1000. FIG. 5 is a cross sectional view in which a local lighting is made. FIG. 5 is an example to show a local lighting in which a center of the room is dim and only corners of the room are brightened.

FIG. 6 is an example that the lighting device according to the present invention is used as an overall lighting device to brighten entire room. In FIG. 6, an overall lighting device is formed by combining a light of large light distribution angle emitted from left half of the lighting device 10 with a light of large light distribution angle emitted from right half of the lighting device 10. By the way, since FIG. 6 is a cross sectional view, it looks as the lighting device is divided into left half and right half, however, if the lighting device is viewed as a plan view, the structure is continuous.

Concrete structure of the present invention shown by FIGS. 5 and 6 will be explained in the following embodiment.

Figure 7:
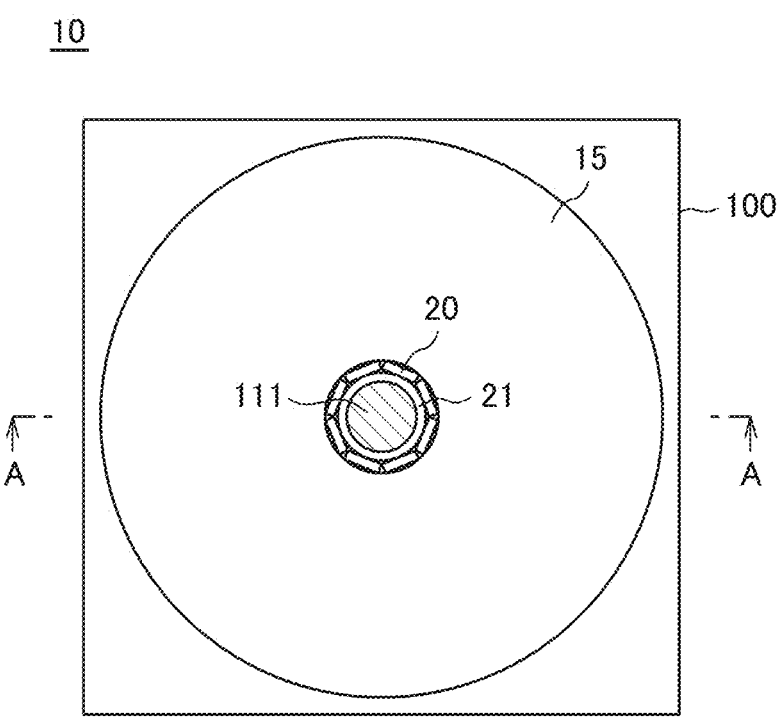
FIG. 7 is a perspective plan view of the lighting device according to the present invention.
Figure 8:
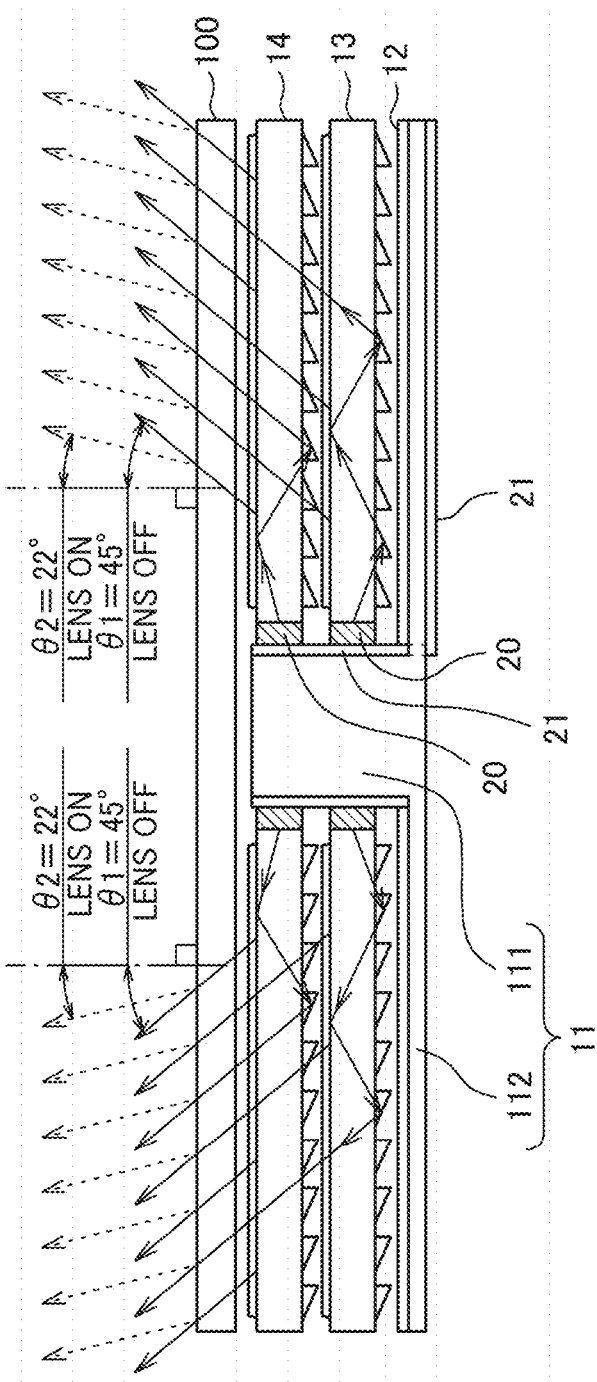
FIG. 8 is a cross sectional view of FIG. 7 along the line A-A.

FIG. 7 is a perspective plan view of the lighting device 10 according to example 1; FIG. 8 is a cross sectional view along the line A-A of FIG. 7. By the way, the cover and so forth of the lighting device are omitted in FIGS. 7 and 8 and following figures. In FIG. 7, upper most part is a liquid crystal lens of rectangle, and a circular essential part of the lighting device is disposed under the liquid crystal lens. In FIG. 7, a light guide pair 15, which is constituted of two disc like light guides, is adapted to an axis 111 of a frame 11, which has a T shaped cross section (see FIG. 8). By the way, a flexible wiring substrate for LED 21, on which LEDs 20 as a light source are disposed, is wrapped around the axis 111 of the frame 11. That is to say, in FIG. 7, the light from the LED 20 propagates from inner side to outer side of the light guide pair 15, and is emitted from the upper major surface of the light guide pair 15, namely, in a direction of a liquid crystal lens 100. The outer size of the lighting device of FIG. 7 is e.g. 100 mm square including the liquid crystal lens 100. In FIG. 7, even the outer shape of the liquid crystal lens 100 is rectangle, it can be circular according to necessity.

FIG. 8 is a cross sectional view along A-A line of FIG. 7. A reflection sheet 12, a lower light guide plate 13 and an upper light guide plate 14 are disposed in this order on a flange 112 of the frame 11. Those elements have hollows at the centers and are fitted to the axis 111 of the frame 11. The liquid crystal lens 100 is disposed on the upper light guide 14.

In FIG. 8, the flexible wiring substrate 21 for LED, on which LEDs 20 as a light source are disposed, is wrapped around the axis 111 of the frame 11. A part of the flexible wiring substrate 21 extends to rear side of the frame 11 through a cutout formed in the flange 112 of the frame 11. Since LED generates heat, the frame 11 is preferably made of metal considering heat dissipation. The heat from the LED conducts through the axis of the frame 11 and dissipated from the flange 112 of the frame 11.

In FIG. 8, the reflection sheet 12 is disposed on the flange 112. For an example, ESR (Enhanced Specular reflector) of 3M can be used as the reflection sheet 12. A thickness of the reflection sheet 12 is e.g. approximately 70 μm. One of the characteristics of the present invention is to dispose the lower light guide 13, which is a first light guide, and the upper light guide 14, which is a second light guide, on the reflection sheet 12. LEDs are disposed in accordance to the inner walls of each of the light guides 13 and 14.

The arrows show light passes of the light entered the light guides 13 and 14 from the LEDs. The light entered the upper light guide 14 and the lower light guide 13 repeats reflections at each of the interface, and goes to upper direction, namely, to a direction of emitting surface. In the structure of FIG. 8, reflections occur at the interface between the upper light guide 14 and the lower light guide 13, therefore, the light can be directed to the emitting surface more efficiently compared with a case when only one light guide exist. More detailed structure of the light guide is explained later.

The other feature of the present invention is, as shown in FIG. 6 and FIG. 8, to dispose the plurality of LEDs 20 along the inner walls of the upper light guide 14 and the lower light guide 13; consequently, the present invention enables to suppress a power consumption of LEDs, mitigate a temperature rise of LEDs and suppress a deterioration in light emitting efficiency of the LEDs.

The yet another feature of the present invention is to dispose the liquid crystal lens 100 on the upper light guide 14. In FIG. 8, the light is emitted from the major surface of the upper light guide 14 in a direction of 45 degrees to outside with respect to normal direction, and enters the liquid crystal lens 100. This light is deflected by the liquid crystal lens 100, and emits in a direction of 22 degrees with respect to normal direction of the major surface of the liquid crystal lens 100. The liquid crystal lens 100 in FIG. 8 has a role to deflect the light emitting from the upper light guide 14.

In other words, when the liquid crystal lens 100 is ON, the light from the lighting device is emitted in a direction of $\theta 2$ which is 22 degrees with respect to the normal direction of the liquid crystal lens 100. On the other hand, when the liquid crystal lens is OFF, the light from the lighting device is emitted in a direction of $\theta 1$ which is 45 degrees with respect to the normal direction of the liquid crystal lens 100. The value of $\theta 2$ can take a various value according to the applied voltage to the liquid crystal lens 100. In addition to the above function, the liquid crystal lens 100 can diverge or converge the light emitted from the upper light guide 14. The structure of the liquid crystal lens 100 is explained later.

Figure 9:
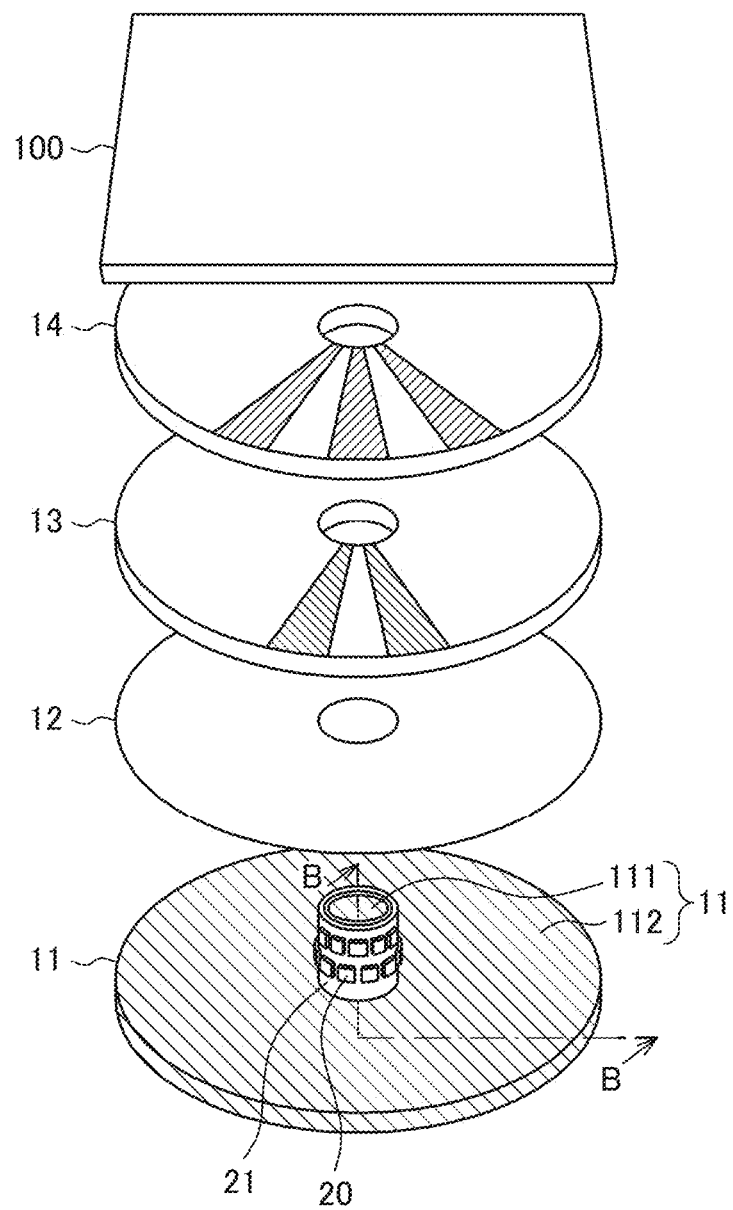
FIG. 9 is an exploded perspective view of the lighting device according to the present invention.
Figure 10:
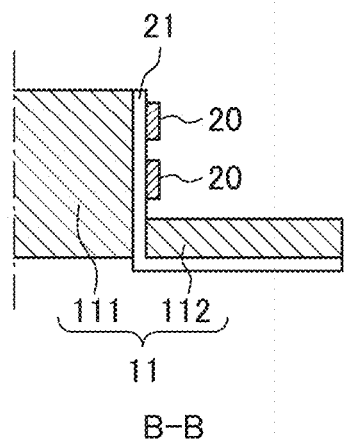
FIG. 10 is a cross sectional view of FIG. 9 along the line B-B.

FIG. 9 is an exploded perspective view of the structure of FIG. 8. In FIG. 9, the flexible wiring substrate 21, on which the LEDs 20 are disposed is adhered around the axis 111 of the frame 11. FIG. 10, which is a cross sectional view along the line B-B in FIG. 9, is a detailed view around the axis 111 of the frame 11. The LEDs 20 are disposed in two tiered on the flexible wiring substrate 21, and are disposed to oppose to the upper light guide 14 and the lower light guide 13. The LED 20 becomes high temperature, the heat of the LED 20 is dissipated to the axis 111 of the frame 11, which is made of metal, through a thin flexible wiring substrate 21.

Figure 11:
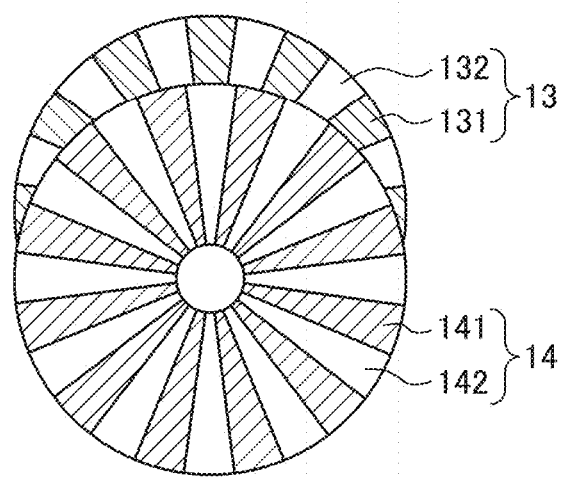
FIG. 11 is a plan view in which a first light guide and a second light guide are overlapped.

Back to FIG. 9, the axis 111 of the frame 11 is inserted in the holes of the reflection sheet 12, the lower light guide 13 and the upper light guide 14. FIG. 11 is a plan view of the upper light guide 14 and the lower light guide 13. The pattern areas 131 and 141, and no pattern areas 132 and 142 are formed in the lower light guide 13 and the upper light guide 14, respectively. When the lower light guide 13 and the upper light guide 14 are superposed, the pattern area 131 of the lower light guide 13 overlaps the no pattern area 142 of the upper light guide 14; and the no patter area 132 of the lower light guide 13 overlaps the pattern area 141 of the upper light guide 14.

Figure 12:
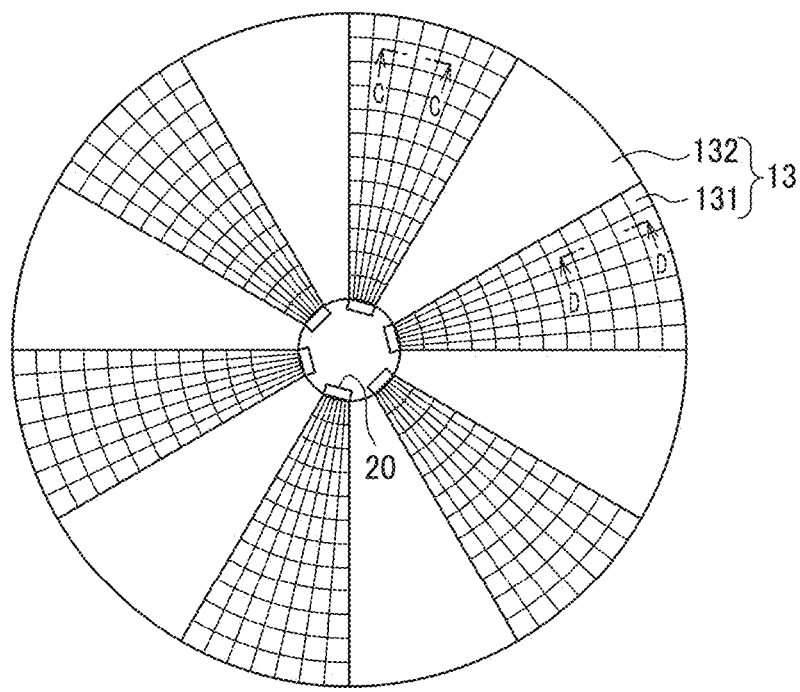
FIG. 12 is a plan view of the first light guide.

FIG. 12 is a plan view of the structure of a prism array formed on the surface of lower light guide 13. In FIG. 12, the area 131 of the prism array and the area 132 of no prism array are disposed alternatively in a circumferential direction. The prism array formed on the top surface of the lower light guide 13 (may be called as a side of major surface) is formed in radially in radius direction; the prism array formed on the bottom surface of the lower light guide 13 (may be called as a back surface) is formed in concentrically. The LEDs 20 are disposed at the inner wall corresponding to the region where the prism arrays are formed.

Figure 13:
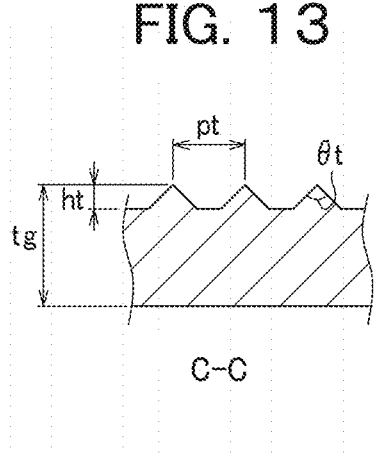
FIG. 13 is a cross sectional view of FIG. 12 along the line C-C.

FIG. 13 is a cross sectional view of FIG. 12 along the line C-C, which is a cross section of the prism array formed on a surface of the major surface of the light guide 13. The prism array of the major surface is a pattern radially extending from the center; therefore, a pitch pt of the prism array changes according to the locations. A thickness tg of the light guide is e.g. 1.5 mm; a height ht of prism array is e.g. 0.05 mm; the apex angle $\theta t$ is e.g. 90 degrees.

Figure 14:
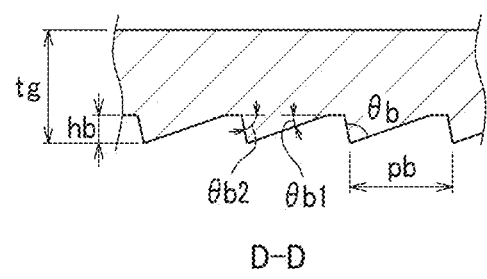
FIG. 14 is a cross sectional view of FIG. 12 along the line D-D.

FIG. 14 is a cross sectional view of FIG. 12 along the line D-D, which is a cross section of the prism array formed on the back surface of the light guide 13. The prism array of the back surface is a pattern formed in concentrically. The cross section of the prism is a scalene triangle; an outer side is longer than an inner side. That is to say, the prim array of FIG. 14 emits light from the LEDs 20 in an upper direction oblique to the major surface. The prism array of FIG. 14 is not enough to direct the light in normal direction of the major surface of the light guide.

In FIG. 14, as to angles in prism, an angle $\theta b1$ is e.g. 15 degrees, an angle $\theta b2$ is e.g. 85 degrees. Those angles are determined according to a necessary direction of light (for example, the angle $\theta 1$ in FIG. 8). A pitch pb of concentric array is 0.1 μm, a height hb of the prism is e.g. 0.02 μm, and apex angle $\theta b$ is e.g. 80 degrees. A height hb of the prism formed on the back surface is lower than a height ht of the prism formed on the major surface. The angle $\theta b2$ is preferably between 80 degrees and 90 degrees; when the angle $\theta b2$ is nearer to 90 degrees, the light distribution angle can be made smaller, namely, a collimated light can be formed. The apex angle $\theta b$ can be changed according to the angle $\theta b1$ and the angle $\theta b2$. The adjustment of light distribution can be controlled by changing a height hb of the prism, given angles and pitches pb of the prism are fixed.

The above explanation is made for the lower light guide 13; however, the same figure can be applied to the upper light guide 14. When the lower light guide 13 and the upper light guide 14 are assembled, the lower light guide 13 and the upper light guide 14 are deviated each other in circumferential direction so that the pattern area of upper light guide 14 superposes the no pattern area of lower light guide 13.

Figure 15:
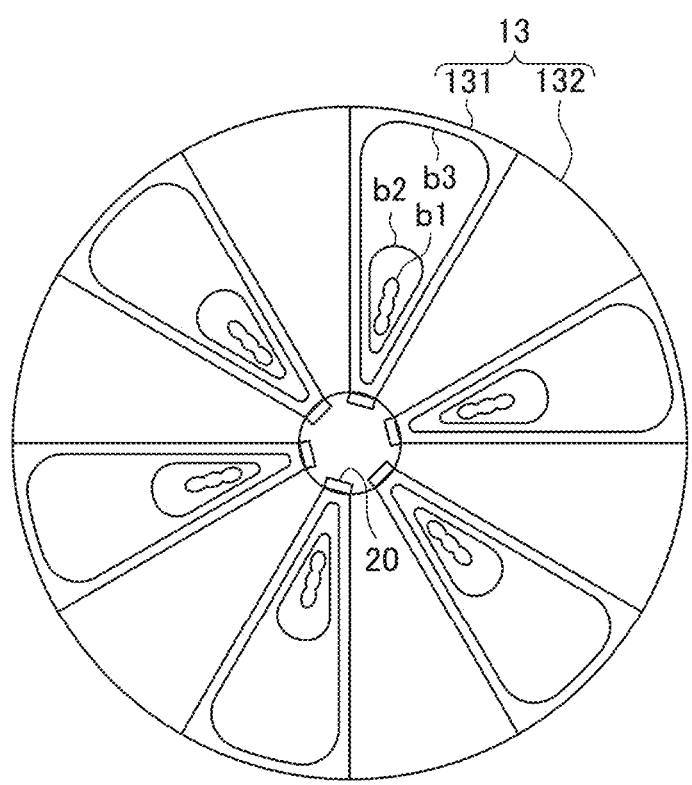
FIG. 15 is contour of brightness at the surface of the light guide.

FIG. 15 is a plan view of brightness pattern of the major surface of the light guide 13 when the LED 20, which is disposed at the inner wall of the light guide 13, is lighted on. In FIG. 15, the LED 20 is disposed corresponding to the pattern area 131 of the light guide 13. The light emitted from the LED 20 disposed at the side wall of the hole of the light guide 13 is emitted from the pattern area 131 of the major surface by the reflection sheet 12, and the prism arrays formed on the major surface and the back surface of the light guide 13.

In FIG. 15, b1, b2, b3 are contour of the brightness; b1 is the place of brightest. The feature of FIG. 11 is that the light from the LED 20 is emitted only from the corresponding pattern area 131 of the light guide 13. That is to say, the light from the LED 20 is efficiently collected to the pattern area 131 of the major surface according to prism arrays formed on the major surface and the back surface of the light guide 13. The above behavior is the same in the upper light guide 14.

Figure 16:
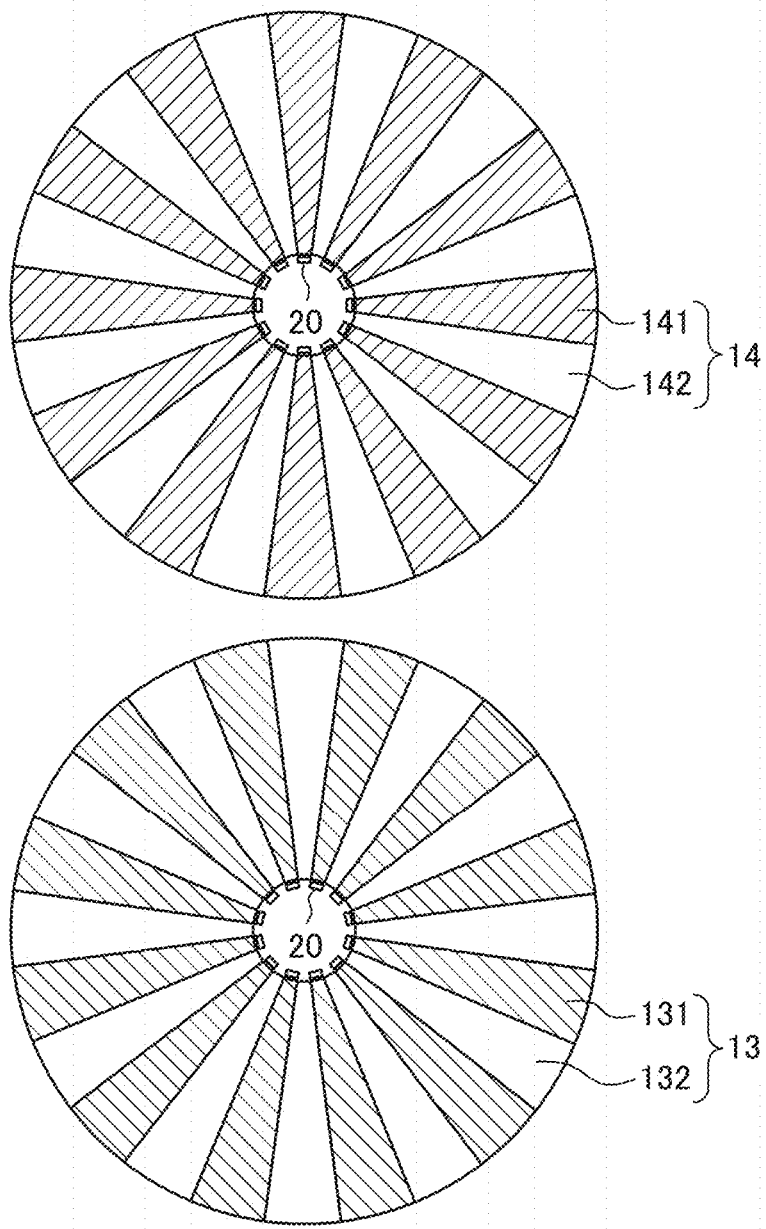
FIG. 16 is a plan view in which the first light guide and the second light guide are juxtaposed for comparison.

FIG. 16 is a plan view of brightness distributions at the major surfaces of the upper light guide 14 and the lower light guide 13 when the LEDs 20 are lighted on. In FIG. 16, the hatched parts in the upper light guide 14 and the lower light guide 13 are bright areas, namely the place where the LEDs 20 are disposed. In FIG. 16, the LEDs 20 disposed at the upper light guide 14 and LEDs 20 disposed at the lower light guide 13 are different ones.

Figure 17:
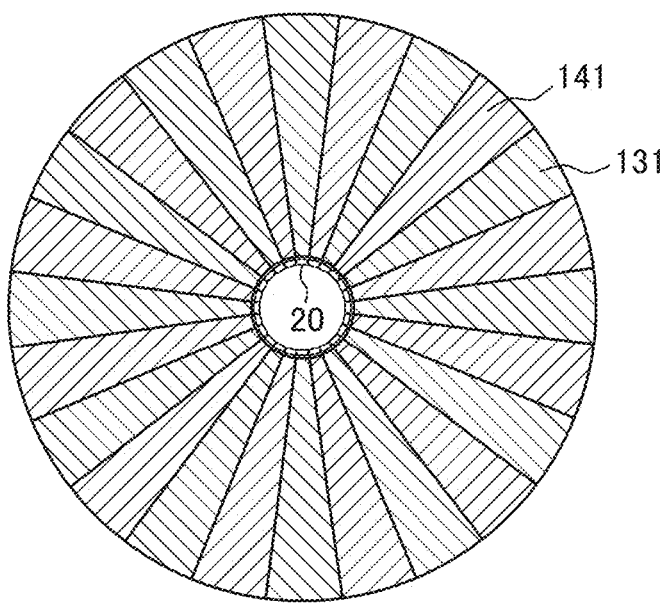
FIG. 17 is a plan view in which the first light guide and the second light guide are superposed.

FIG. 17 is a brightness distribution when the upper light guide 14 and the lower light guide 13 are superposed. The upper light guide 14 and the lower light guide 13 are superposed as that a bright area from which the light from the LED 20 is emitted and a dark area from which the light from the LED 20 is not emitted overlap; therefore, the light is emitted uniformly from the major surface of the light guide 14.

Figure 18:
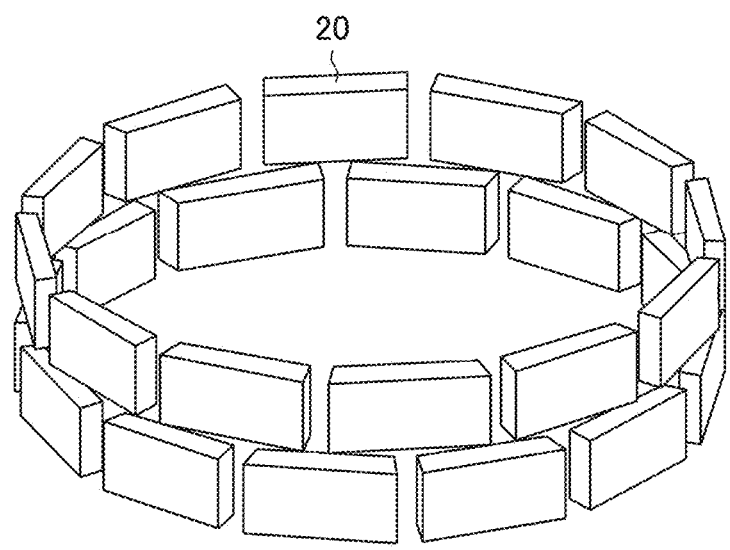
FIG. 18 is a perspective view of a disposition of LEDs.

FIG. 18 is a perspective view of the disposition of the LEDs 20, which are disposed at the inner wall of the lower light guide 13 and the inner wall of the upper guide 14. The LEDs 20 are disposed circumferentially in upper tier and in lower tier; the LEDs 20 in the upper tier and the LEDs 20 in the lower tier are disposed alternative in azimuth direction. According to the above disposition, more LEDs 20 can be disposed; thus, power consumption of each of LEDs 20 can be suppressed, and heat generation can be mitigated.

As shown in FIG. 8, the light emitted from the major surface of the second light guide 14 is directed oblique to outside with respect to normal direction of the major surface of the second light guide 14. The light emitted from the second light guide 14 has a predetermined light distribution angle according to characteristics of the first light guide 13 and the second light guide 14. One feature of the present invention is that the liquid crystal lens 100 is disposed on the second light guide 14 to change the direction of the emitting light or to change the light distribution angle of the emitting light by divergence effect or convergence effect of the liquid crystal lens 100.

Figure 19:
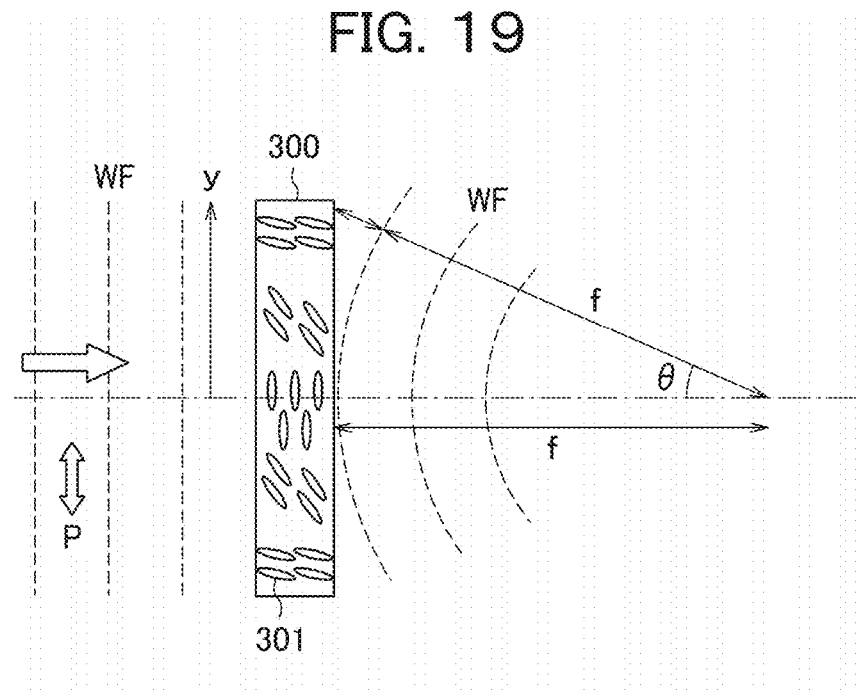
FIG. 19 is an example of a convex lens formed by a liquid crystal lens.

FIG. 19 is a cross sectional view which shows function of a liquid crystal lens. In FIG. 19, collimated light enters a liquid crystal layer 300 from left hand side. P in FIG. 19 means a polarized direction of impinging light. Generally, the polarized direction of normal light distributes randomly, however, the liquid crystal has an anisotropy in refraction; therefore, FIG. 19 shows a function of the liquid crystal layer 300 to the light polarized in P direction.

In FIG. 19, liquid crystal molecules 301 align as that a tilting angle becomes larger in going to periphery of the liquid crystal layer 300 due to electrical field from the electrodes. A liquid crystal molecule 301 has an elongated shape; effective refractive index in the long axis is larger than effective refractive index in the short axis in the liquid crystal molecule 301; therefore, refractive index in the liquid crystal layer 300 becomes larger in going to periphery, thus, a convex lens is formed. In FIG. 23, the broken line is a light wave front WF, and f is a focus distance.

Figure 20:
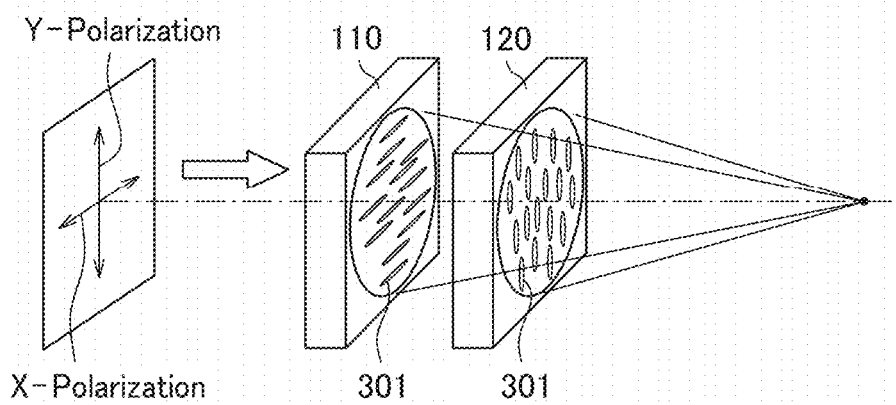
FIG. 20 is a perspective view of the liquid crystal lens structure, which has two liquid crystal lenses.

Liquid crystal has refractive index anisotropy; therefore, a second lens, which works on the light polarized in orthogonal direction to the polarized direction of light on which the first lens works, is necessary. FIG. 20 is an exploded perspective view of this lens structure. In FIG. 20, the parallelogram in left hand side is the wave front of light. In FIG. 20, the light polarized in x direction and the light polarized in y direction light enter the liquid crystal layer 300. The first liquid crystal lens 110 works on the light polarized in x direction; the second liquid crystal lens 120 works on the light polarized in y direction.

In FIG. 20, initial alignment directions of the liquid crystal molecules 301 are orthogonal between in the first liquid crystal lens 110 and the second liquid crystal lens 120.

The initial alignment direction of the liquid crystal molecule 301 is determined by alignment direction of the alignment film formed in the liquid crystal lens. That is to say, in FIG. 20, the alignment directions of the alignment films of the substrates on the side from which the light enters from outside in two liquid crystal lenses, are orthogonal to each other between the two liquid crystal lenses.

Figure 21:
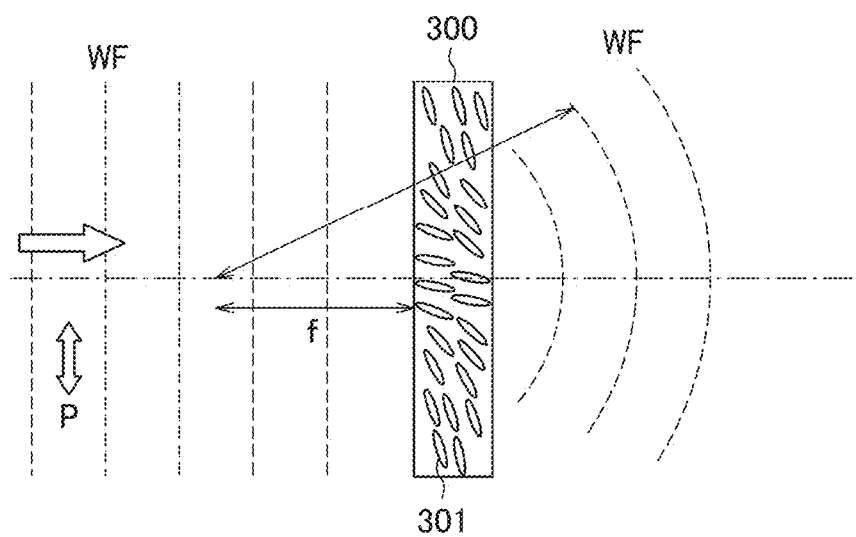
FIG. 21 is an example of a concave lens formed by the liquid crystal lens.

FIG. 21 shows to form a concave lens by liquid crystal lens. In FIG. 21, the light having the wave front WF, which is parallel to the liquid crystal layer 300, and polarized in one direction enters the liquid crystal layer 300 from left hand side. In FIG. 21, the liquid crystal molecules 301 align as that the tilting angle becomes smaller in going to periphery of the liquid crystal layer 300 due to electrical field from the electrodes. Due to the above lens structure, the wave front WF of light, which has passed the liquid crystal layer 300, becomes a curve as shown by broken line in FIG. 25, thus, concave lens is formed. In the meantime, in the case of concave lens also, two liquid crystal lenses are necessary as explained in FIG. 20.

FIG. 22 shows a structure of the liquid crystal lens to deflect the light to left direction. In FIG. 22, the top figure is a cross sectional view of the liquid crystal lens 100. A first electrode 102 is formed on a first substrate 101 of the liquid crystal lens 100; a second electrode 104 is formed on a second substrate 103; the liquid crystal layer 300 is disposed between the first electrode 102 and the second electrode 104. The liquid crystal layer 300 is sealed by a seal material 105. In FIG. 22, there is only one liquid crystal lens because a polarizing plate 250 is used, instead of using two liquid crystal lenses.

In FIG. 22, when voltage V is applied to electrodes so that voltage difference between the first electrode 102 and the second electrode 104 becomes larger from left to right, as shown in the bottom figure of FIG. 22, the tilting angle of the liquid crystal molecule 301 changes according to position, thus, effective birefringence Δn of the liquid crystal layer 300 changes. According to the above explained structure of the liquid crystal layer 300, the collimated light LL, which entered from bottom side of the liquid crystal lens 100, is deflected to left direction when it exits from the liquid crystal lens 100.

FIG. 23 shows a structure of the liquid crystal lens 100 to deflect light to right direction. In FIG. 23, the top figure is the same as the top figure of FIG. 22 except an application of voltages between the first electrode 102 and the second electrode 104. When voltage V is applied between the first electrode 102 and the second electrode 104 as that voltage difference between the first electrode 102 and the second electrode 104 becomes smaller from left to right, as shown in the bottom figure of FIG. 23, the tilting angle of the liquid crystal molecule 301 changes according to position, thus, the effective birefringence Δn changes as shown in the bottom figure. According to the above explained structure of the liquid crystal layer 300, the collimated light LL, which entered from bottom side of the liquid crystal lens 100, is deflected to right hand direction when it exits from the liquid crystal lens 100.

Figure 24:
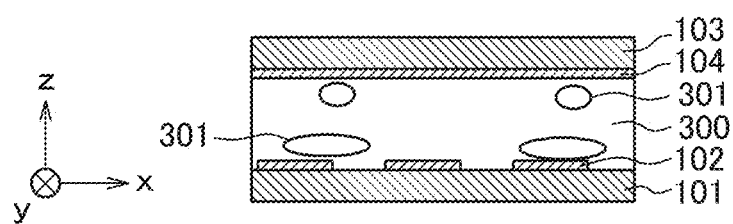
FIG. 24 is a cross sectional view of the liquid crystal lens according to a first example.

FIG. 24 is a cross sectional view of a first example of actual structure of the liquid crystal lens 100. In FIG. 24, the first electrode 102 is formed on the first substrate 101, the second electrode 104 is formed on the second substrate 103, and the liquid crystal layer 300 is sandwiched between the first substrate 101 and the second substrate 103. Alignment films are formed over the first electrode 102 and the second electrode 104; however, alignment films are omitted in FIG. 24. It is the same in other figures. The initial alignment directions of the liquid crystal molecules 301 are determined by alignment treatment, as rubbing process and the like, to the alignment film.

In FIG. 24, the initial alignment direction of the liquid crystal molecules 301 on the first substrate 101 side and the initial alignment direction of the liquid crystal molecules 301 on the second substrate 103 are orthogonal to each other, namely, it is a so called TN (Twisted Nematic) type liquid crystal lens. The first electrode 102 extends in x direction and the second electrode 104 extends in y direction. However, forming the liquid crystal lens 100 in the present invention is not limited to TN type liquid crystal.

Figure 25:
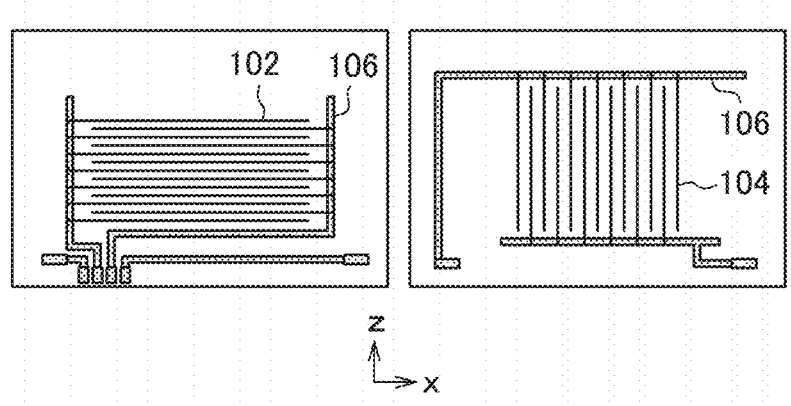
FIG. 25 is plan views of a first electrode and a second electrode of the liquid crystal lens according to the first example.

The figure of left hand side of FIG. 25 is a plan view of the first electrode 102 formed on the first substrate 101. The figure of right hand side of FIG. 25 is a plan view of the second electrode 104 formed on the second substrate 103. The first electrodes 102 extend in x direction; the second electrodes 104 extend in y direction. The liquid crystal molecules 301 align according to voltage at a cross point of the first electrode 102 and the second electrode 104. That is to say, various functions of liquid crystal lens can be performed by voltages applied to the first electrode 102 and the second electrode 104.

Figure 26:
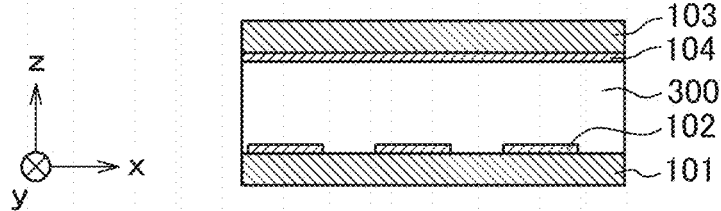
FIG. 26 is a cross sectional view of the liquid crystal lens according to a second example.
Figure 27:
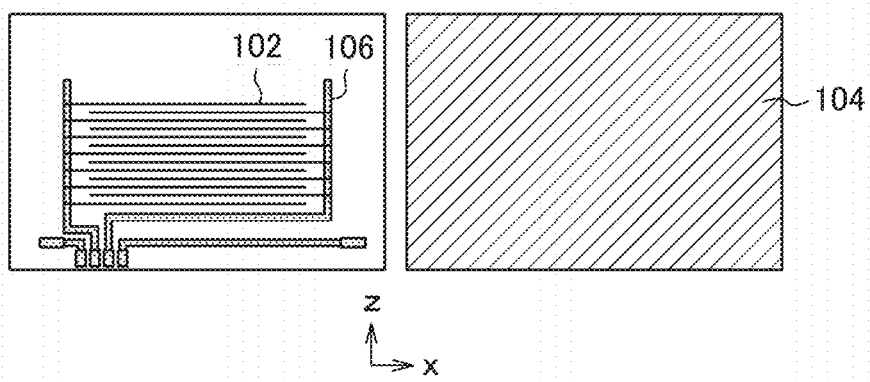
FIG. 27 is plan views of a first electrode and a second electrode of the liquid crystal lens according to the second example.

FIG. 26 is a cross sectional view of a second example of actual structure of the liquid crystal lens 100. In FIG. 26, the first electrode 102 of stripe is formed on the first substrate 101, the second electrode 104 of stripe is formed on the second substrate 103, and the liquid crystal layer 300 is sandwiched between the first substrate 101 and the second substrate 103. The figure of left hand side of FIG. 27 is a plan view of the first electrode 102 formed on the first substrate 101; the first electrode extends in x direction. The figure of right hand side of FIG. 27 is a plan view of the second electrode 104 formed on the second substrate 103; the second electrode 104 is plane shaped. Second example also, as first example, various functions of liquid crystal lens can be performed by voltages applied to the first electrode 102 and the second electrode 104.

Figure 28:
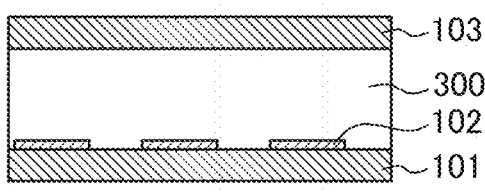
FIG. 28 is a cross sectional view of the liquid crystal lens according to a third example.
Figure 29:
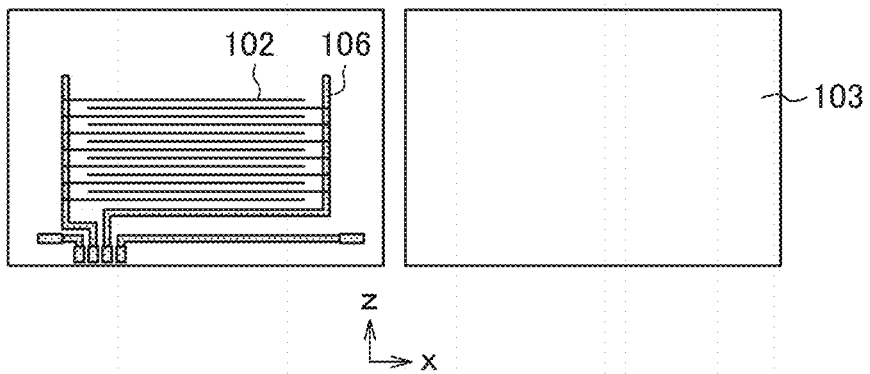
FIG. 29 is plan views of a first electrode and a second electrode of the liquid crystal lens according to the third example.

FIG. 28 is a cross sectional view of a third example of actual structure of the liquid crystal lens 100. In FIG. 28, the first electrode 102 of stripe is formed on the first substrate 101; there is no electrode on the second substrate 103. The figure of left hand side of FIG. 29 is a plan view of the first electrode 102 formed on the first substrate 101; the first electrode 102 extends in x direction. The figure of right hand side of FIG. 29 shows only the second substrate 103; there is no second electrode on the second substrate 103.

The third example is an in plane field type liquid crystal lens, in which the liquid crystal is driven only by the first electrodes 102 formed on the first substrate 101. That is to say, the liquid crystal molecules 301 are aligned by potential difference formed between the striped first electrodes 102. Various types of liquid crystal lens can be formed by changing voltages between the striped first electrodes 102.

FIG. 30 is a cross sectional view of a fourth example of actual structure of the liquid crystal lens 100. In FIG. 30, the concentric first electrodes 102 are formed on the first substrate 101, the second electrode 104 of planar shape is formed on the second substrate 103, and the liquid crystal layer 300 is sandwiched between the first substrate 101 and the second substrate 103. The figure of left hand side of FIG. 31 is a plan view of the first electrode 102 formed on the first substrate 101. The first electrodes 102 are concentric shape. Each of electrodes of concentric is connected with an extraction electrode 106 to receive voltages. The figure of right hand side of FIG. 31 shows the second electrode 104 is formed in plane shaped.

In FIG. 31, a lens of various strength can be formed by changing a voltage between the first electrode 102 and the second electrode 104. Since the first electrodes 102 are concentric, the fourth example can easily form a circular lens.

Figure 32:
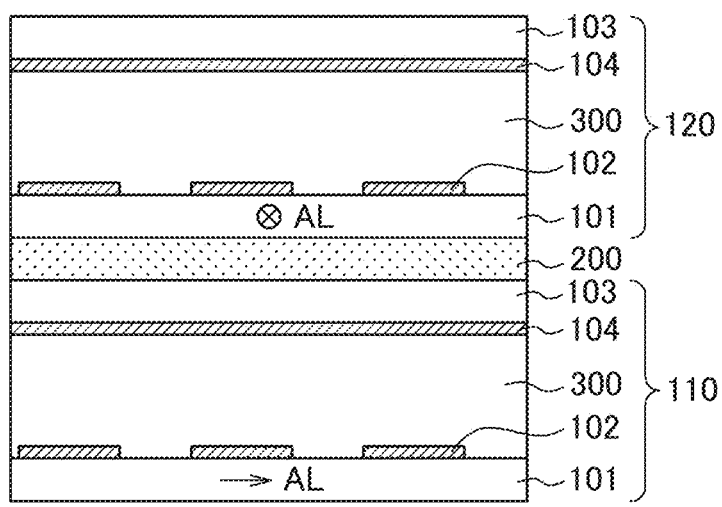
FIG. 32 is a cross sectional view of the lens structure when two liquid crystal lenses are used.

The liquid crystal lens in FIGS. 24 through 31 is explained for one piece of liquid crystal lens. The liquid crystal, however, can control light polarized in singular direction, therefore, in actual system, two liquid crystal lenses are used in pair. FIG. 32 is a cross sectional view in which the first liquid crystal lens 110 and the second liquid crystal lens 120 are superposed and are adhered through the adhesive 200.

In FIG. 32, the first liquid crystal lens 110 uses TN type liquid crystal, in which the first electrode 102 is formed on the first substrate 101, the second electrode 104 is formed on the second substrate 103, and the liquid crystal layer 300 is sandwiched between the first substrate 101 and the second substrate 103. The second liquid crystal lens 120 has the same structure. Even the structure of the first liquid crystal lens 110 and the second liquid crystal lens 120 are the same, the alignment direction AL of the alignment film of the first substrate 101 of the first liquid crystal lens 110 and the alignment direction AL of the alignment film of the first substrate 101 of the second liquid crystal lens 120 are orthogonal. That is to say, the first liquid crystal lens 110 acts on the polarized light in first direction of the incident light; and the second liquid crystal lens 120 acts on the polarized light in second direction, which is orthogonal to the first direction, of the incident light.

Figure 33:
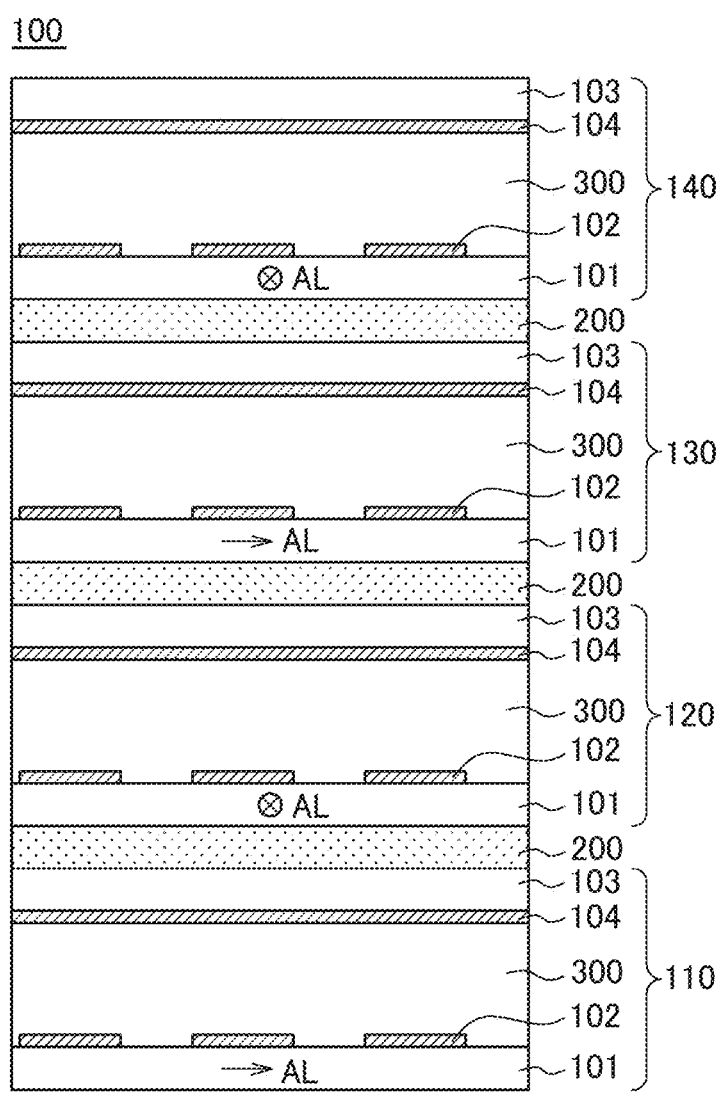
FIG. 33 is a cross sectional view of the lens structure when four liquid crystal lenses are used.

If a lens effect or a deflection effect is not enough with two liquid crystal lenses, four liquid crystal lenses can be used. FIG. 33 is an example, in which four liquid crystal lenses are assembled with the adhesive 200. In FIG. 33, the first liquid crystal lens 110, the second liquid crystal lens 120, the third liquid crystal lens 130, the fourth liquid crystal lens 140 are superposed from the bottom. The structures of the first liquid crystal lens 110 and the second liquid crystal lens 120 are the same as explained with FIG. 32. The structure and effect of third liquid crystal lens 130 and fourth liquid crystal lens 140 are the same as the liquid crystal first lens 110 and the liquid crystal second lens 120.

In FIG. 33, the alignment direction AL of the alignment film of the first substrate 101 of the first liquid crystal lens 110 and the alignment direction AL of the alignment film of the first substrate 101 of the second liquid crystal lens 120 are orthogonal; and the alignment direction AL of the alignment film of the first substrate 101 of the third liquid crystal lens 130 and the alignment direction AL of the alignment film of the first substrate 101 of the fourth liquid crystal lens 140 are orthogonal.

By the way, the alignment directions in alignment films of the first to fourth liquid crystal lenses can have other combinations than the structure of FIG. 33. In addition, each of the liquid crystal lenses are not limited to a TN type liquid crystal lens.

Figure 34:
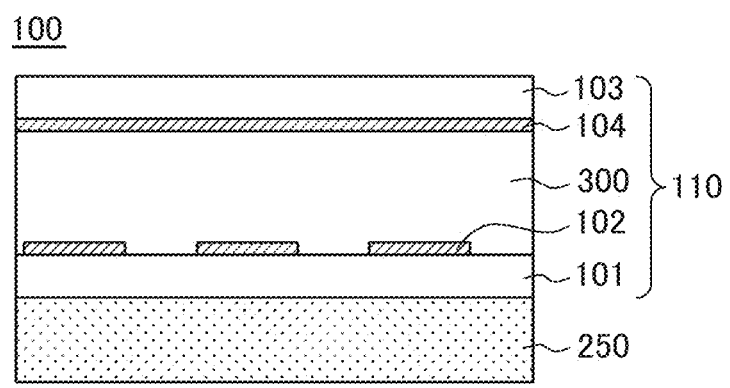
FIG. 34 is a cross sectional view of the liquid crystal lens when one liquid crystal lens and one polarization plate are used.

FIG. 34 is the structure when only one liquid crystal lens is used. In FIG. 34, the polarizing plated 250 is adhered at the bottom of the first liquid crystal lens 110. The structure and the effect of the first liquid crystal lens 110 are the same as explained with FIGS. 24 through 27. Since liquid crystal can act on light of specific polarization direction, it is necessary to make incident only the polarized light to the first liquid crystal lens 110.

In FIG. 34, the polarized light, which is controllable by the liquid crystal, is made incident to the first liquid crystal lens 110 by disposing the polarizing plate 250 at the bottom of the first substrate 101 of the first liquid crystal lens 110. If the polarizing plate 250 is used, however, the light having a polarizing axis perpendicular to the transmission axis of the polarizing plate 250 cannot pass. This problem can be mitigated by utilizing the reflective polarizing plate 250, which reflects the light that cannot pass the polarizing plate 250. That is to say, the reflected light from the reflective polarizing plate 250 is reflected again at a side of prism sheet to a direction of the reflective polarizing plate 250 with rotating the polarizing axis, thus, the light becomes to be utilized, consequently utilization efficiency of light can be improved.

As described above, according to the present invention, one lighting device can perform an overall lighting and a local lighting. In addition, by adding a liquid crystal lens, a position of light spot and the light distribution angle of the light spot can be changed freely.

What is claimed is:

1. A lighting device comprising:
   a first light guide having a first major surface and a first back surface, and a first hole at a first center,
   a second light guide, disposed on the first light guide, having a second major surface and a second back surface, and a second hole at a second center,
   a reflection sheet disposed under the first back surface of the first light guide, and
   a liquid crystal lens disposed above the second major surface of the second light guide,
   wherein a plurality of first LEDs are disposed circumferentially along a side wall of the first hole,
   a plurality of second LEDs are disposed circumferentially along a side wall of the second hole, and
   the first LEDs and the second LEDs are displaced each other in azimuth direction.

2. The lighting device according to claim 1,
   wherein a first prism array is formed on the first major surface of the first light guide, the first prism array extending radially in radius direction and arranged in circumferential direction,
   a second prism array is formed on the first back surface of the first light guide, the second prism array being formed concentrically in circumferential direction,
   a third prism array is formed on the second major surface of the second light guide, the third prism array extending radially in radius direction and arranged in circumferential direction, and
   a fourth prism array is formed on the second back surface of the second light guide, the fourth prism array being formed concentrically in circumferential direction.

3. The lighting device according to claim 2,
   wherein a cross section of the first prism array and a cross section of the third prism array are isosceles triangles, and
   a cross section of the second prism array and a cross section of the fourth prism array are scalene triangles.

4. The lighting device according to claim 3,
   wherein a side of the scalene triangle is longer in an outer circumference direction and is shorter in an inner circumference direction.

5. The lighting device according to claim 2,
   wherein the first light guide has a first fan shaped area which opposes in radius direction to the first LED, and a second area which does not oppose in radius direction to the first LED,
   the first prism array and the second prism array are formed in the first area and not formed in the second area,
   the second light guide has a third fan shaped area which opposes in radius direction to the second LED, and a fourth area which does not oppose in radius direction to the second LED, and
   the third prism array and the fourth prism array are formed in the third area and not formed in the fourth area.

6. The lighting device according to claim 5,
   wherein the first area of the first light guide and the fourth area of the second light guide overlap in a plan view.

7. The lighting device according to claim 1,
   wherein the lighting device further include a frame, which has a circular flange and an axis projecting like a cylinder formed at center of the flange,
   the reflection sheet, the first light guide, and the second light guide are stacked in this order on the flange, and
   the plurality of the first LEDs and the plurality of the second LEDs are disposed around the axis.

8. The lighting device according to claim 1,
   wherein the liquid crystal lens has a converging effect to an incident light.

9. The lighting device according to claim 1,
   wherein the liquid crystal lens has a diverging effect to an incident light.

10. The lighting device according to claim 1,
    wherein the liquid crystal lens changes a direction to an incident light.

11. The lighting device according to claim 1,
    wherein the liquid crystal lens changes a direction of an incident light to inner circumference direction.

* * * * *